United States Patent [19]

Hildebrand

[11] Patent Number: 5,049,602
[45] Date of Patent: Sep. 17, 1991

[54] COSTABILIZERS FOR MOLDING COMPOSITIONS BASED ON POLYMERS OF VINYL CHLORIDE

[75] Inventor: Thomas Hildebrand, Dortmund, Fed. Rep. of Germany

[73] Assignee: Huels Aktiengesellschaft, Marl, Fed. Rep. of Germany

[21] Appl. No.: 589,803

[22] Filed: Sep. 26, 1990

[30] Foreign Application Priority Data

Sep. 26, 1989 [DE] Fed. Rep. of Germany ....... 3932048

[51] Int. Cl.⁵ ............................................. C07D 498/10
[52] U.S. Cl. ........................................ 524/95; 524/97; 524/99; 524/104; 524/382; 524/399; 524/502; 524/514
[58] Field of Search ................. 524/97, 382, 399, 502, 524/514, 99, 104

[56] References Cited

U.S. PATENT DOCUMENTS

| | | | |
|---|---|---|---|
| 4,267,083 | 5/1981 | Torloting | 524/99 |
| 4,369,276 | 1/1983 | Wirth | 524/104 |
| 4,515,916 | 5/1985 | Molt | 524/99 |
| 4,755,549 | 7/1988 | Kemper et al. | 524/227 |

*Primary Examiner*—Paul R. Michl
*Assistant Examiner*—Yong S. Lee
*Attorney, Agent, or Firm*—Oblon, Spivak, McClelland, Maier & Neustadt

[57] ABSTRACT

Costabilizers which are composed of pyrroles and/or dihydropyridines and/or copolymers of oxazolines and bisoxazolines and/or polyols enhance the stabilizing effect of primary stabilizers such as polyoxazolines and zinc compounds in thermoplastic molding compositions, such as those based on polymers of vinyl chloride.

10 Claims, 8 Drawing Sheets

COSTABILIZERS FOR MOLDING COMPOSITIONS BASED ON POLYMERS OF VINYL CHLORIDE

BACKGROUND OF THE INVENTION

1. Field of the Invention

The present invention relates to rigid or plasticized, stabilized thermoplastic molding compositions based on halogen-containing polymers, in particular polyvinyl chloride or polymers containing essentially vinyl chloride.

2. Discussion of the Background

It is known that chloride-containing polymers are readily degraded by the action of heat, for example during processing. This degradation leads to undesired discolorations and to an impairment of the mechanical properties. Consequently, this degradation is avoided by adding stabilizers to the polymers before processing. In the case of polyvinyl chloride and copolymers containing essentially vinyl chloride, particular use is made of organotin compounds, inorganic and organic lead salts, organic antimony compounds or combinations of cadmium carboxylates and barium carboxylates and also of a mixture of zinc soaps and polyoxazolines. These so-called primary stabilizers are frequently supplemented with costabilizers to improve their effectiveness. The modes of action of primary or costabilizers and their combined action (synergism) are described in the relevant literature, for example in the publication by L. I. Nass, "Heat Stabilizers", *Kirk-Othmer Encyclopedia of Chemical Technology*, volume 12, 3rd edition, page 225, published by John Wiley and Sons, 1980.

Essentially, these are costabilizers which improve the initial color and the ultimate stability of the chlorine-containing polymer. For instance, epoxy compounds, polyols, organic phosphites, substituted dihydropyridines, 1,3-diketones or combinations of these compounds are used.

At the present time, there are no highly effective costabilizers for primary stabilizers based on polymers. Therefore, there remains a need for substances or mixtures of substances which enhance or reinforce the heat-stabilizing action of polymeric primary stabilizers.

SUMMARY OF THE INVENTION

Accordingly, one object of this invention is to provide costabilizers which enhance the heat-stabilizing action of stabilizers.

It is another object to provide costabilizers which enhance the heat-stabilizing action of primary polymeric stabilizers.

It is another object to provide costabilizers which enhance the heat-stabilizing action of stabilizers used to stabilize halogen-containing polymers.

It is another object to provide novel stabilizer mixtures which stabilize halogen-containing polymers to the action of heat.

It is another object to provide novel stabilized thermoplastic molding compositions which contain a costabilizer which enhances the heat-stabilizing action of stabilizers.

It is another object to provide novel stabilized thermoplastic molding compositions which contain a costabilizer which enhances the heat-stabilizing action of primary polymeric stabilizers.

It is another object to provide novel stabilized thermoplastic molding compositions based on halogen-containing polymers which contain a stabilizer and a costabilizer which enhances the heat stabilizing action of the stabilizer.

These and other objects which will become apparent during the following detailed description have been achieved by stabilized molding compositions based on chlorine-containing polymers, which contain one or more compounds of zinc of the formula (I)

in which $R^1$ and $R^2$ may be identical or different and represent straight-chain or branched, unsubstituted or optionally hydroxyl-substituted aliphatic acyl groups having 8 to 21 carbon atoms or aryl groups which are optionally substituted by alkyl groups having 1 to 22 carbon atoms and additionally at least one polymeric primary stabilizer from the group of polyoxazolines of the formula

in which each occurrence of $R^3$ can be different and is, independently, a straight-chain or branched alkyl group having 1 to 22 carbon atoms or a substituted or unsubstituted cycloalkyl or aryl group, preferably an alkyl group having 1 to 12 carbon atoms, while n represents an integer of from 10 to 10,000; and at least two primary-stabilizer-supporting compounds of the formulae III, V or VI and, optionally, in addition a substance according to formula IV

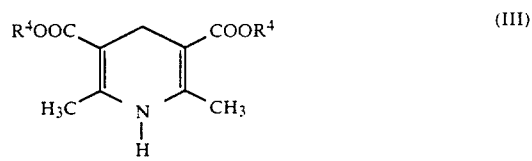

and a copolymer (V) composed of

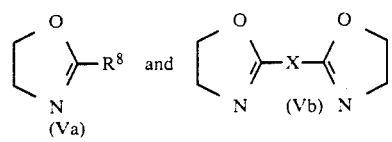

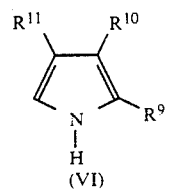

in which, in the case of the compound of formula (III), $R^4$ denotes $C_9$–$C_{22}$-alkyl or $C_9$–$C_{22}$-alkenyl, cyclohexyl, phenyl or substituted phenyl; the formula (IV) is a polyfunctional linear and/or branched organic compound having 4 to 20 carbon atoms in which the functional group is understood to be the hydroxyl group; in the case of the compound of the formula (V), which is synthesized from the compounds of the formula (Va) and (Vb), $R^8$ is a straight-chain or branched alkyl group having from 1 to 20 carbon atoms, a cyclic and/or alkyl-substituted cyclic alkyl group having from 5 to 10 carbon atoms, a straight-chain or branched alkenyl group having from 3 to 18 carbon atoms, an alkyl-, halogeno- or hydroxyl-substituted aryl group, a straight-chain or branched alkoxy group having from 1 to 20 carbon atoms, a straight-chain or branched alkylcarbonyl group having from 1 to 20 carbon atoms or a cyano group;

X is a straight-chain or branched alkylene group having from 1 to 20 carbon atoms, a cyclic and/or alkyl-substituted cyclic alkylene group having from 5 to 10 carbon atoms, a straight-chain or branched alkenylene group having from 3 to 18 carbon atoms, an alkyl-, halogeno-, cyano- or hydroxyl-substituted arylene group, a straight-chain or branched alkyleneoxy group having from 1 to 20 carbon atoms, a straight-chain or branched alkylenecarbonyl group having from 1 to 20 carbon atoms; and in the case of the compound of the formula (VI), $R^9$ is methyl or phenyl, $R^{10}$ is hydrogen, cyano, $C_2$-$C_{10}$-alkylcarbonyl, $C_7$-$C_{10}$-arylcarbonyl, phenylaminocarbonyl, m-hydroxyphenylaminocarbonyl, α-hydroxyethyl or carboxyl which has been esterified with a $C_1$-$C_{18}$-alcohol, $C_6$-$C_8$-cycloalkanol, $C_5$-$C_{19}$-aralkanol, $C_2$-$C_{20}$-alkanediol, $C_4$-$C_{20}$-thioalkanediol or pentaerythritol, and $R^{11}$ is methyl, phenyl or ($C_1$-$C_{19}$-alkoxy)methyl.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
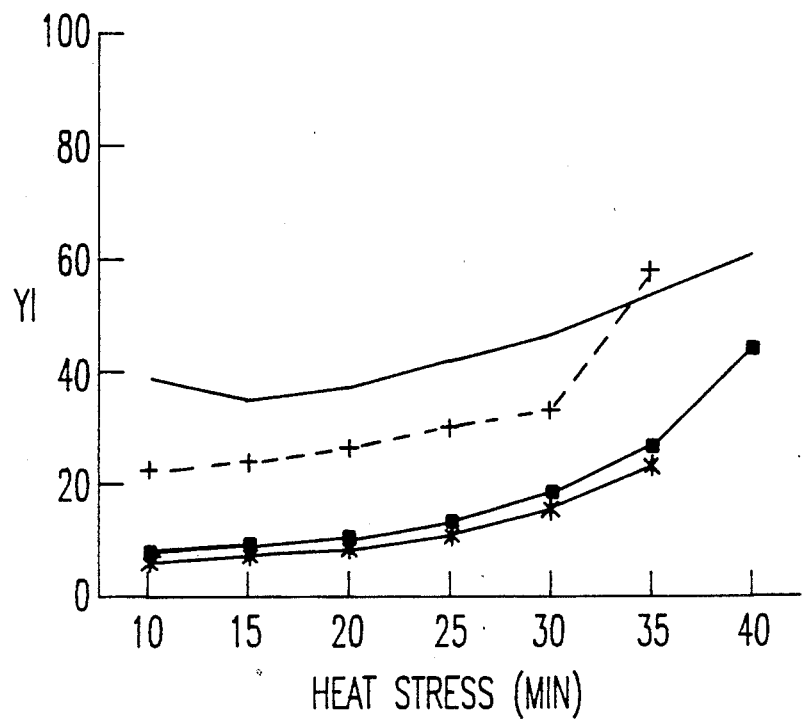
FIGS. 1, 3 and 5 graphically illustrate the heat-stabilizing effect of various stabilizers in various thermoplastic molding compositions by plotting the Yellowness Index (YI) as a function of the time of heat stress, for the stabilizers: Zn/Ca (.), Zn/PC (+), Zn/PC/TMP/DHP (*) and Zn/PC/TMP/DHP/Py (□)

The chlorine-containing polymers are preferably vinyl chloride homopolymers or vinyl chloride copolymers. Preference is furthermore given to suspension polymers and mass polymers and also to emulsion polymers. Suitable comonomers for the copolymers are for example: vinyl acetate, vinylidene chloride, trans-dichloroethene, ethylene, propylene, butylene, maleic acid, acrylic acid, fumaric acid and itaconic acid. Other suitable chlorine-containing polymers are post-chlorinated PVC and chlorinated polyolefins, and also graft copolymers of PVC with ethylene-vinyl acetate (EVA), acrylonitrile-butadienestyrene (ABS) and methacrylate-butadiene-styrene (MBS).

The invention also provides the use of stabilizer systems composed of at least one zinc compound and characterized in that they contain one or more compounds of zinc of the formula

$$R^1O-Zn-OR^2 \qquad (I).$$

in which $R^1$ and $R^2$ may be identical or different and represent straight-chain or branched, optionally hydroxyl-substituted aliphatic acyl groups having 8 to 21 carbon atoms or aryl groups which are optionally substituted by alkyl groups having 1 to 22 carbon atoms. The $C_8$-$C_{21}$-carboxylic acids are for example benzoic acid, p-tert-butylbenzoic acid or aliphatic carboxylic acids, in particular octanoic acid, dodecanoic acid, stearic acid or oleic acid.

Preferred examples of zinc compounds are zinc soaps of fatty acids having 8 to 36, preferably 8 to 22 carbon atoms. Suitable examples of these are caprylates, caprates, laurates, myristates, palmitates, stearates and behenates. It is also possible to use the salts of branched fatty acids such as 2-ethylhexanoic acid, 2-octyldecanoic acid or tetradecyloctadecanoic acid or hydroxy-fatty acids such as 9(10)-hydroxystearic acid or 9,10-dihydroxystearic acid. The zinc soaps may be composed of the salts of individual fatty acids or from fatty acid mixtures such as are obtained from natural fats. Suitable salts of aromatic carboxylic acids are in particular the zinc salts of benzoic acid and of substituted benzoic esters, in particular of alkylsubstituted benzoic acid. Suitable phenolates are: methylphenolates, tert-butylphenolates, nonylphenolates, dodecylphenolates or naphthenates of zinc.

Particularly relevant are chlorine-containing polymers which contain a compound of the formula (I) and additionally contain at least one polymeric primary stabilizer from the group of polyoxazolines of the formula:

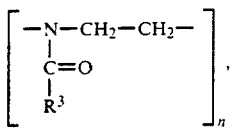

in which each occurrence of $R^3$ may be different and is, independently, a straight-chain or branched alkyl group having 1 to 22 carbon atoms or a substituted or unsubstituted cycloalkyl or aryl group, preferably an alkyl group having 1 to 12-carbon atoms, while n represents an integer of from 10 to 10,000 (cf. DE-C-0,253,985). Examples of compounds of the formula II are polymethyloxazoline, polyethyloxazoline, poly-n-propyloxazoline, polyisopropyloxazoline, polyundecyloxazoline and polyphenyloxazoline. Other primary stabilizers which can be used are copolymers of two different alkyl- or aryl-oxazolines each being present in a proportion of between 5% and 95%. It is also possible to use terpolymers of three different oxazolines, each being present in a proportion of 5 to 95%.

Other highly suitable materials are those stabilized molding compositions which, in addition to the above-mentioned primary stabilizers (I) and (II), contain compounds of tin, lead or antimony or combinations of compounds of cadmium, barium, calcium and zinc and also the primary-stabilizer-supporting costabilizer combinations of compounds of the formulae:

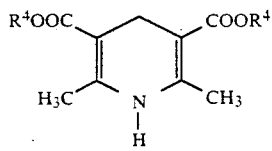

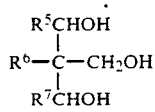

and a copolymer (V) composed of

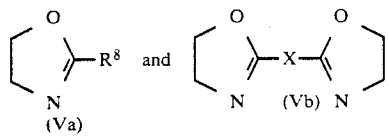

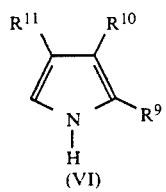

in which, in the case of the compound of formula (III), $R^4$ is $C_9$-$C_{22}$-alkyl or $C_9$-$C_{22}$-alkenyl, cyclohexyl, phenyl or substituted phenyl, such as chlorophenyl, anisyl or tolyl. Preference is given to the use of dihydropyridines of the formula (III) in which $R^4$ is $C_9$-$C_{14}$-alkyl (cf. DE-B-2,844,130).

The formula (IV) is a polyfunctional linear and/or branched organic compound having 4 to 20 carbon atoms in which the function is understood to be the hydroxyl group. Preference is given to the use of compounds of the formula (IV) in which $R^5$ and $R^7$ are hydrogen and $R^6$ denotes hydrogen, methyl, ethyl and propyl; a particular example is 2,2-bis(hydroxymethyl)-1-butanol (see, e.g., EP-A-0,315,793).

The compound of the formula (V) is synthesized from compounds of the formula (Va) and (Vb) in which $R^8$ is a straight-chain or branched alkyl group having from 1 to 20 carbon atoms, including, e.g., methyl, ethyl, propyl, isopropyl, butyl, isobutyl, pentyl, isopentyl, hexyl, isohexyl, heptyl, isoheptyl, octyl, isooctyl, nonyl, isononyl, decyl, isodecyl, dodecyl, isododecyl, tridecyl, tetradecyl, hexadecyl, octadecyl or arachinyl; or a cyclic or alkyl-substituted cyclic alkyl group having from 5-to 20 carbon atoms, including, e.g., cyclopentyl, cyclohexyl, cycloheptyl, cyclcooctyl, cyclononyl, cyclodecyl, cyclododecyl, cyclotridecyl, cyclotetradecyl, cyclohexadecyl, cyclooctadecyl or cyclcoarachinyl.

$R^8$ may furthermore be a straight-chain or branched alkenyl group having from 3 to 18 carbon atoms including, e.g., propenyl, butenyl, pentenyl, hexenyl, heptenyl, octenyl, nonenyl, decenyl, dodecenyl, tetradecenyl, hexadecenyl or octadecenyl.

Furthermore, $R^8$ may also represent alkyl-, halogeno-, or hydroxyl-substituted or unsubstituted aryl, such as for example, phenyl, o-tolyl, m-tolyl, p-tolyl, p-tert-butylphenyl, p-nonylphenyl, p-dodecylphenyl, o-hydroxyphenyl, m-hydroxyphenyl, p-hydroxyphenyl, o-chlorophenyl, m-chlorophenyl or p-chlorophenyl.

$R^8$ may also be a straight-chain or branched alkoxy group having from 1 to 20 carbon atom, including, e.g., methoxy, ethoxy, propoxy, isopropoxy, butoxy, isobutoxy, pentyloxy, isopentyloxy, hexyloxy, isohexyloxy, heptyloxy, isoheptyloxy, octyloxy, isooctyloxy, nonyloxy, isononyloxy, decyloxy, isodecyloxy, dodecyloxy, isododecyloxy, tridecyloxy, tetradecyloxy, hexadecyloxy, octadecyloxy or arachinyloxy; or cyano; or a straight-chain or branched alkylcarbonyl group having from 1 to 20 carbon atoms, including, e.g., methyl-, ethyl-, propyl-, isopropyl-, butyl-, isobutyl-, pentyl-, isopentyl-, hexyl-, isohexyl-, heptyl-, isoheptyl-, octyl-, isooctyl-, nonyl-, isononyl-, decyl-, isodecyl-, dodecyl-, isododecyl-, tridecyl--, tetradecyl-, hexadecyl-, octadecyl- or arachinyl-carbonyl.

X may be a straight-chain or branched alkylene group having from 1 to 20 carbon atoms, including, e.g., methylene, ethylene, propylene, isopropylene, butylene, isobutylene, pentylene, isopentylene, hexylene, isohexylene, heptylene, isoheptylene, octylene, isooctylene, nonylene, isononylene, decylene, isodecylene, dodecylene, isododecylene, tridecylene, tetradecylene, hexadecylene, octadecylene or arachinylene; or a cyclic or alkyl-substituted cycloalkylene group having 5 to 10 carbon atoms, including, e.g., cyclopentylene, cyclohexylene, cycloheptylene, cyclooctylene, cyclononylene, or cyclodecylene.

Moreover, X may also be an alkenylene group having from 3 to 18 carbon atoms, including, e.g., ethenylene, propenylene, butenylene, pentenylene, hexenylene, heptenylene, octenylene, nonenylene, decenylene, dodecenylene, tetradecenylene, hexadecenylene or octadecenylene.

Furthermore, X may also represent an alkyl-, halogen-, cyano, or hydroxyl-substituted or unsubstituted arylene, such as, for example, phenylene, o-tolylene, o-nonylphenylene, o-dodecylphenylene, o-hydroxyphenylene, o-chlorophenylene or o-cyanophenylene.

X may also be a straight chain or branched alkyleneoxy group having from 1 to 20 carbon atoms, including, e.g., methyleneoxy, ethyleneoxy, propyleneoxy, isopropyleneoxy, butyleneoxy, isobutyleneoxy, pentyleneoxy, isopentyleneoxy, hexyleneoxy, isohexyleneoxy, heptyleneoxy, isoheptyleneoxy, octyleneoxy, isooctyleneoxy, nonyleneoxy, isononyleneoxy, decyleneoxy, isodecyleneoxy, dodecyleneoxy, isododecyleneoxy, tridecyleneoxy, tetradecyleneoxy, hexadecyleneoxy, octadecyleneoxy or archinyleneoxy.

X may also be a straight-chain or branched alkylenecarbonyl group having from 1 to 20 carbon atoms, including, e.g., ethylene-, propylene-, isopropylene-, butylene-, isobutylene-, pentylene-, isopentylene-, hexylene-, isohexylene-, heptylene-, isoheptylene-, octylene-, isooctylene-, nonylene-, isononylene-, decylene-, isodecylene-, dodecylene-, isododecylene-, tridecylene-, tetradecylene-, hexadecylene-, octadecylene- or arachinylene-carbonyl.

Preference is given to the use of compounds of the formulae (Va) and (Vb) in which $R^8$ is methyl, ethyl or propyl and in which X is ethylene, trimethylene, tetramethylene or phenylene.

The preparation of the costabilizers V may be carried out by reacting the compounds (Va) and (Vb) in a mole ratio of from 90:10 to 99:1, preferably from 94:6 to 99:1, especially preferably in a ratio of Va:Vb greater than about 95:5, in particular in about 97.5 to 2.5, mole% in ethylbenzene (containing about 95 ppm of water) with catalytic amounts (0.5 to 1.5 mole%, in particular 0.9 mole%) of methyl 4-toluenesulphonate employing a reaction time of about 12 to 15 minutes at 133° C. and a post-polymerization time of 60 minutes at 133° C. A crosslinked copolymer (V) is obtained in yields of >95%.

In the case of the compound of the formula (VI), $R^9$ is methyl or phenyl, $R^{10}$ is hydrogen, cyano, $C_2$-$C_{19}$-alkylcarbonyl, $C_7$-$C_{10}$-arylcarbonyl, phenylaminocarbonyl, m-hydroxyphenylaminocarbonyl, α-hydroxyethyl, or carboxyl esterified with a $C_1$-$C_{18}$-alcohol, $C_5$-$C_8$-cycloalkanol, $C_5$-$C_{19}$-aralkanol, $C_2$-$C_{20}$-alkanediol, $C_4$-$C_{20}$-thioalkanediol or pentaerythritol, and $R^{11}$ is methyl, phenyl or ($C_1$-$C_{19}$-alkoxy) methyl.

$R^{10}$ as $C_2$-$C_{19}$-alkylcarbonyl is in particular propionyl, butyryl, lauroyl or particularly acetyl, as $C_7$-$C_{10}$-arylcarbonyl is optionally substituted benzoyl, in particular benzoyl itself, and, as esterified carboxyl, is one which has been esterified with $C_1$-$C_{18}$-alkanol such as for example, methanol, ethanol, n-octanol or lauryl alcohol, $C_6$-$C_{19}$-aralkanol such as for example, benzyl alcohol or furfuryl alcohol, $C_5$-$C_8$-cycloalkanol such as for example, cyclohexanol, $C_2$-$C_{20}$-alkanediol such as ethylene glycol or 1,2-butylene glycol, $C_4$-$C_{20}$-thioalkanediol such as for example, 3-thio-1,5-dihydroxypentane, or pentaerythritol.

$R^{11}$ as $C_1$-$C_{18}$-alkoxymethyl is in particular methoxymethyl or ethoxymethyl.

Preference is given to the use of the pyrroles, 2-methyl-3-ethoxycarbonyl-4-phenylpyrrole and 2-methyl-3-methoxycarbonyl-4-phenylpyrrole.

The pyrroles may be prepared by a plurality of methods (see, e.g., Houben-Weyl, *Methoden der organischen Chemie*, Nitrogen Compounds II, volume 11/1).

One method of preparation is to condense α-chloroketones and β-ketoesters under the action of $NH_3$.

The stabilized molding compositions contain the compounds of the formula I and II advantageously in amounts in each case of 0.02 to 2.0 percent by weight, in particular in amounts of 0.05 to 1.0 percent by weight, based on the weight of the chlorine-containing polymer.

The stabilized molding compositions contain the compounds of the formulae III to VI advantageously in amounts from 0 to 2.0 percent by weight, preferably, in the case of compounds of the formula III, in amounts from 0.05 to 0.1 percent by weight, in the case of compounds of the formula IV in amounts from 0.02 to 1.0 percent by weight, in the case of compounds of the formula VI in amounts from 0.05 to 1.0 percent by weight, and in the case of compounds of the formula V advantageously in amounts from 0.001 to 2.0, in particular 0.01 to 0.05 percent by weight, based on the weight of the chlorine-containing polymer.

The costabilizers are used as follows:

At least two representatives from the substance categories III, V or VI must be used; in addition, a compound of the formula IV may be added.

It is possible to use commercially available costabilizers in conjunction with the listed costabilizers.

Suitable prior-art phosphites are phosphites of the general formulae VII and VIII

in which $R^{12}$, $R^{13}$ and $R^{14}$ are identical or different and are $C_6$-$C_{18}$-alkyl, a phenyl group which may be unsubstituted or substituted with $C_1$-$C_9$-alkyl or $C_1$-$C_9$-alkoxy, or $C_5$-$C_7$-cycloalkyl, and in which $R^{15}$ is $C_5$-$C_{18}$-alkyl.

If $R^{12}$, $R^{13}$, $R^{14}$ and $R^{15}$ denote $C_6$-$C_{18}$-alkyl, this is for example n-hexyl, n-octyl, n-nonyl, decyl, dodecyl, tetradecyl, hexadecyl or octadecyl. Preference is given to alkyl groups having 8 to 12 carbon atoms.

$R^{12}$, $R^{13}$ and $R^{14}$, as substituted phenyl, are for example tolyl, ethylphenyl, xylyl, nonyl, cumyl, cresyl, 4-methoxyphenyl, 2,4-dimethoxyphenyl, ethoxyphenyl, butoxyphenyl, p-n-octylphenyl or p-n-nonylphenyl.

Most particularly suitable phosphites are trioctyl, tridecyl, tridodecyl, tritetradecyl, tristearyl, trioleyl, triphenyl, tricresyl, tris-p-nonylphenyl and tricyclohexyl phosphite, and particular preference is given to the aryl dialkyl phosphites and also to the alkyl diaryl phosphites such as for example, phenyl didecyl phosphite, nonylphenyl didecyl phosphite, (2,4-di-tertbutylphenyl) didodecyl phosphite and (2,6-di-tert-butylphenyl) didodecyl phosphite.

Examples of antioxidants are alkylated monophenols and hydroquinones, hydroxylated thiodiphenyl ethers, 1,4 alkylidene-bis-phenols, benzyl compounds, acylaminophenols, esters or amides of β-(3,5-di-tert-butyl-4-hydroxyphenyl)propionic acid and esters of β-(5-tert-butyl-4-hydroxy-3-methylphenyl)propionic acid.

Preferred antioxidants are alkylated monophenols, alkylidene-bisphenols and phenyl-substituted propionic esters, in particular, 2,6-di-tert-butyl-p-cresol, 2,2bis(4'-hydroxyphenyl)propane and n-octadecyl β-(3,5-di-tert-butyl-4-hydroxyphenyl)propionate.

The compounds of the formulae III to VI can also be used with other nitrogen-containing organic stabilizers. Examples of these are cyanamide, dicyandiamide, guanamines such as benzoguanamine, indoles such as phenylindole, pyrazoles (for example as described in GB-B-866,936), ureas and thioureas such as monophenylurea and diphenylthiourea, and aminocrotonic esters; also, β-diketones such as stearylbenzoylmethane, and polyols such as pentaerythritol.

It is observed, with the stabilized molding compositions according to the invention based on polymers of vinyl chloride which contain compounds of the formulae III to VI as costabilizers, that these compounds enhance the stabilizing action of a primary stabilizer mixture of zinc compounds and polymers from the group of polyoxazolines to an extent which could not have been foreseen. The positive effect of these costabilizers is seen as an improvement in the initial color and as a prolongation of the ultimate stability of the halogen-containing polymer. Until now, it has not been possible to achieve this effect by the addition of known costabilizer mixtures.

It is possible to prepare the stabilized molding compositions according to the invention by conventional methods, for example by simple mechanical mixing of the components in conventional mixers. This mixing operation may be used to incorporate other conventional processing auxiliaries, such as for example, lubricants (montan waxes or polyol partial esters), plasticizers, fillers, light stabilizers, pigments or other costabilizers, such as for example, epoxidized fatty acid esters.

It is possible to achieve a homogeneous distribution of the stabilizers in PVC, for example, with the aid of a two-roll mill at 150° to 200° C.

Other features of the invention will become apparent in the course of the following descriptions of exemplary embodiments which are given for illustration of the invention and are not intended to be limiting thereof.

EXAMPLES

Preparation and testing of milled sheet

The action of various stabilizer combinations was tested by determining the static heat stability of a milled sheet. For this purpose, the stabilizer combinations and, optionally, plasticizers and processing auxiliaries were mixed with polyvinyl chloride for 30 seconds in a laboratory mill and then processed on a two-roll mill at a roll temperature of 170° C., with co-rotation, over the course of 5 minutes to form 1 mm thick milled sheets. Strips of dimensions 14×250 mm were cut from the milled sheets and these strips were then subjected to heat stress in a -special oven (Metrastat, type Sigma) at 180° C. Under the test conditions, the test strips were continuously discharged from the heating zone, and the effect of the stabilizers on the color variation was determined.

The color variations were assessed objectively and in comparison with each other by determining the yellowness indices (YI; ASTM Method E 313-73) using a colorimeter (LabScan 5100 plus) from Dr. Slevogt & Co. and plotting yellowness indices against the duration of heat stress. High YI values indicate strong discoloration and thus low stability.

The following stabilizers were used:
Zn=Zinc stearate
ZnOct=Zinc octoate
Ca=Calcium stearate
CaBeh=Calcium behenate
Ba=Barium stearate
Rhod=Benzoylstearoylmethane
PX=Polyethyloxazoline
Cop=Copolymer of ethyloxazoline and tetramethylenebisoxazoline (mole ratio 97,5:2,5)
PC=Copolymer of methyloxazoline and isopropyloxazoline
TMP=Trimethylolpropane
DHP=Dihydro-dimethyl-bis(dodecylcarbonyl)pyridine
Py=Methyl-phenyl-ethyoxycarbonylpyrrole Formulations were prepared from the following ingredients (parts=parts by weight):

Formulation A 100 parts of suspension-polyvinyl chloride (K-value 70; VESTOLIT S 7054; Hüls AG, Marl, West Germany)
30 parts of dioctyl phthalate (VESTINOL AH; Hüls AG, Marl, West Germany)
0.3 part of montan wax

Formulation B 100 parts of suspension-polyvinyl chloride (K-value 70; VESTOLIT S 7054; Hüls AG, Marl, West Germany)
30 parts of dioctyl phthalate (VESTINOL AH; Hüls AG, Marl, West Germany)
0.3 part of zinc stearate
0.6 part of barium stearate

Formulation C 100 parts of suspension-polyvinyl chloride (K-value 70; VESTOLIT S 7054; Hüls AG, Marl, West Germany)
1.0 part of stearic acid

Formulation D 100 parts of suspension-polyvinyl chloride (K-value 60; VESTOLIT S 6058; Hüls AG, Marl, West Germany)
1.0 part of stearic acid

Formulation E 100 parts of mass-polyvinyl chloride (K-value 58; VESTOLIT M 5867; Hüls AG, Marl, West Germany)
5.0 parts of epoxidized soy bean oil (Reoplast 39, Ciba-Geigy AG, Bensheim, West Germany)

The polyvinyl chloride molding compositions were prepared by adding one of the stabilizers from the given tables to one of the formulations A to E, and these mixes were processed in the manner described above to form test strips. The results are presented in Examples 1–16 and FIGS. 1–16.

EXAMPLES 1-6.

A stabilizer mixture from Table 1 was mixed with the indicated formulation, and the results are shown in each example.

TABLE 1

| Stabilizer mixtures | Formulations of the Stabilizers (parts by weight). | | | | | | |
|---|---|---|---|---|---|---|---|
| | Zn | Ca | PC | TMP | DHP | Py | Cop |
| Zn/Ca | 0.5 | 1 | | | | | |
| Zn/PC | 0.2 | | 0.2 | | | | |
| Zn/PC/TMP | 0.2 | | 0.2 | 0.5 | | | |
| Zn/PC/DHP | 0.2 | | 0.2 | | 0.07 | | |

TABLE 1-continued

| Formulations of the Stabilizers (parts by weight). | | | | | | |
|---|---|---|---|---|---|---|
| Stabilizer mixtures | Zn | Ca | PC | TMP | DHP | Py | Cop |
| Zn/PC/TMP/DHP | 0.2 | 0.2 | 0.5 | 0.07 | | | |
| Zn/PC/TMP/DHP/Py | 0.2 | 0.2 | 0.5 | 0.07 | 0.1 | | |
| Zn/PC/TMP/DHP/Cop | 0.2 | 0.17 | 0.5 | 0.07 | | | 0.03 |
| Zn/PC/TMP/DHP/Py/Cop | 0.2 | 0.17 | 0.5 | 0.07 | 0.1 | | 0.03 |

EXAMPLE 1

Formulation 100 parts by wt. of VESTOLIT S 7054
1.0 part by wt. of stearic acid

| | Heat Stress (min) | | | | | | |
|---|---|---|---|---|---|---|---|
| Stabilizers | 10 | 15 | 20 | 25 | 30 | 35 | 40 |
| Zn/Ca | 40 | 36 | 39 | 44 | 48 | 55 | 62 |
| Zn/PC | 23 | 25 | 28 | 31 | 35 | 59 | — |
| Zn/PC/TMP/DHP | 6 | 8 | 9 | 12 | 16 | 24 | — |
| Zn/PC/TMP/DHP/Py | 8 | 9 | 11 | 14 | 19 | 28 | 46 |

These results are presented graphically in FIG. 1.

EXAMPLE 2

Formulation 100 parts by wt. of VESTOLIT S 7054
1.0 part by wt. of stearic acid

| | Heat Stress (min) | | | | | | |
|---|---|---|---|---|---|---|---|
| Stabilizers | 10 | 15 | 20 | 25 | 30 | 35 | 40 |
| Zn/PC/TMP/DHP | 6 | 8 | 9 | 12 | 16 | 24 | — |
| Zn/PC/TMP/DHP/Py | 8 | 9 | 11 | 14 | 19 | 28 | 46 |
| Zn/PC/TMP/DHP/Cop | 6 | 7 | 10 | 13 | 17 | 31 | — |
| Zn/PC/TMP/DHP/Py/Cop | 8 | 8 | 11 | 15 | 18 | 23 | 62 |

Figure 2:
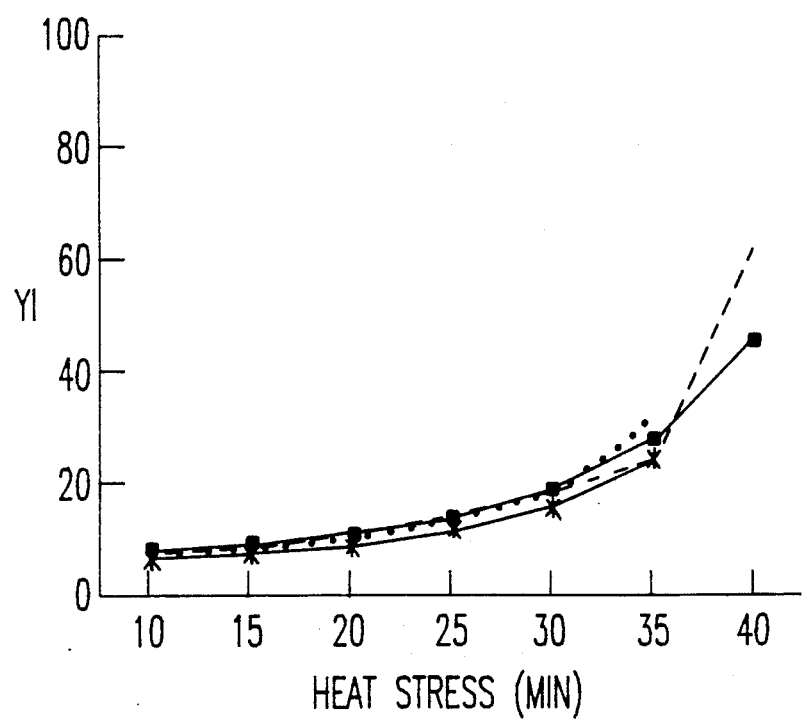
FIGS. 2, 4 and 6 graphically illustrate the heat-stabilizing effect of various stabilizers in various thermoplastic molding compositions by plotting the Yellowness Index (YI) as a function of the time of heat stress, for the stabilizers: Zn/PC/TMP/DHP (*), Zn/PC/TMP/DHP/Py (□), Zn/PC/TMP/DHP/Cop (·) and Zn/PC/TMP/DHP/Py/Cop (—)

These results are presented graphically in FIG. 2.

EXAMPLE 3

Formulation 100 parts by wt. of VESTOLIT S 6058
1.0 part by wt. of stearic acid

| | Heat Stress (min) | | | | | |
|---|---|---|---|---|---|---|
| Stabilizers | 10 | 15 | 20 | 25 | 30 | 35 |
| Zn/Ca | 41 | 40 | 43 | 46 | 54 | 63 |
| Zn/PC | 19 | 22 | 25 | 29 | 33 | 59 |
| Zn/PC/TMP/DHP | 6 | 8 | 9 | 11 | 54 | 75 |
| Zn/PC/TMP/DHP/Py | 8 | 9 | 9 | 11 | 12 | 84 |

Figure 3:
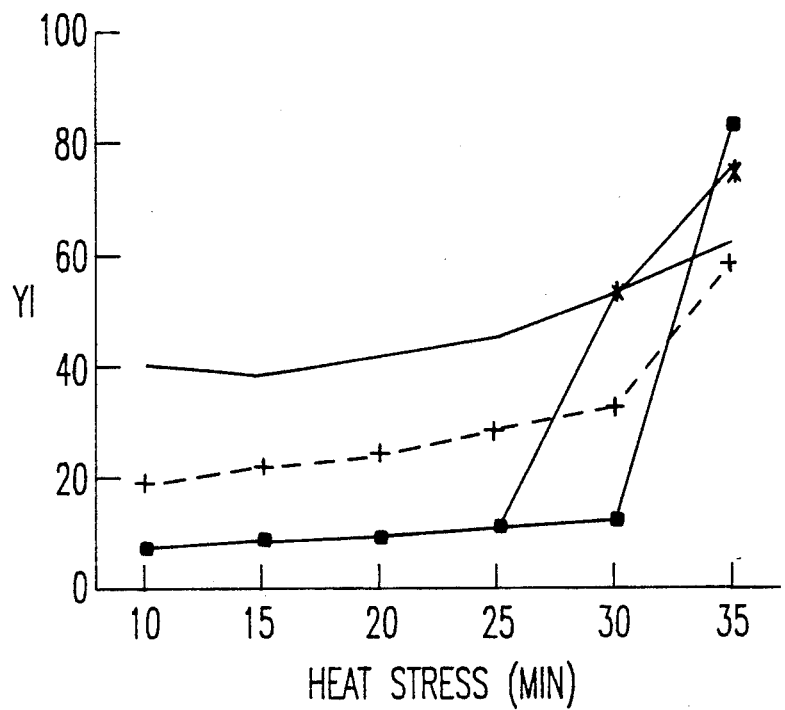

These results are presented graphically in FIG. 3.

EXAMPLE 4

Formulation 100 parts by wt. of VESTOLIT S 6058
1.0 part by wt. of stearic acid

| | Heat Stress (min) | | | | | |
|---|---|---|---|---|---|---|
| Stabilizers | 10 | 15 | 20 | 25 | 30 | 35 |
| Zn/PC/TMP/DHP | 6 | 8 | 9 | 11 | 54 | 75 |
| Zn/PC/TMP/DHP/Py | 8 | 9 | 9 | 11 | 12 | 84 |
| Zn/PC/TMP/DHP/Cop | 7 | 8 | 10 | 12 | 16 | 73 |

| | Heat Stress (min) | | | | | |
|---|---|---|---|---|---|---|
| Stabilizers | 10 | 15 | 20 | 25 | 30 | 35 |
| Zn/PC/TMP/DHP/Py/Cop | 7 | 9 | 10 | 12 | 17 | 63 |

Figure 4:
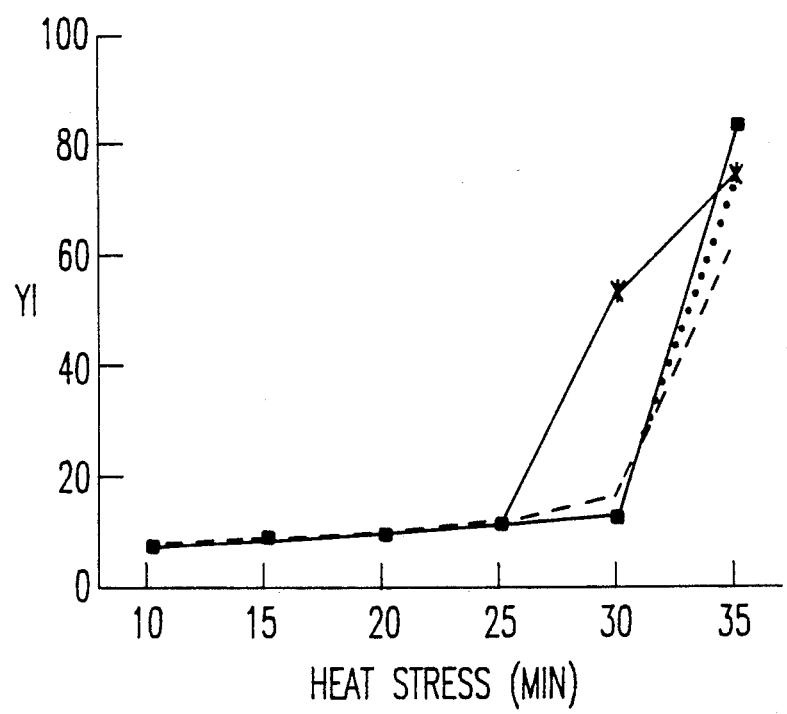

These results are presented graphically in FIG. 4.

EXAMPLE 5

Formulation 100 parts by wt. of VESTOLIT S 7054
30 parts by wt. of VESTINOL AH
0.3 parts by wt. of Montan wax

| | Heat Stress (min) | | | | | | | |
|---|---|---|---|---|---|---|---|---|
| Stabilizers | 10 | 15 | 20 | 25 | 30 | 35 | 40 | 45 |
| Zn/Ca | 13 | 14 | 15 | 15 | 12 | 14 | 30 | 84 |
| Zn/PC | 6 | 6 | 7 | 8 | 7 | 11 | 61 | 95 |
| Zn/PC/TMP/DHP | 4 | 4 | 4 | 4 | 5 | 6 | 18 | 93 |
| Zn/PC/TMP/DHP/Py | 4 | 4 | 4 | 5 | 6 | 7 | 12 | 57 |

Figure 5:
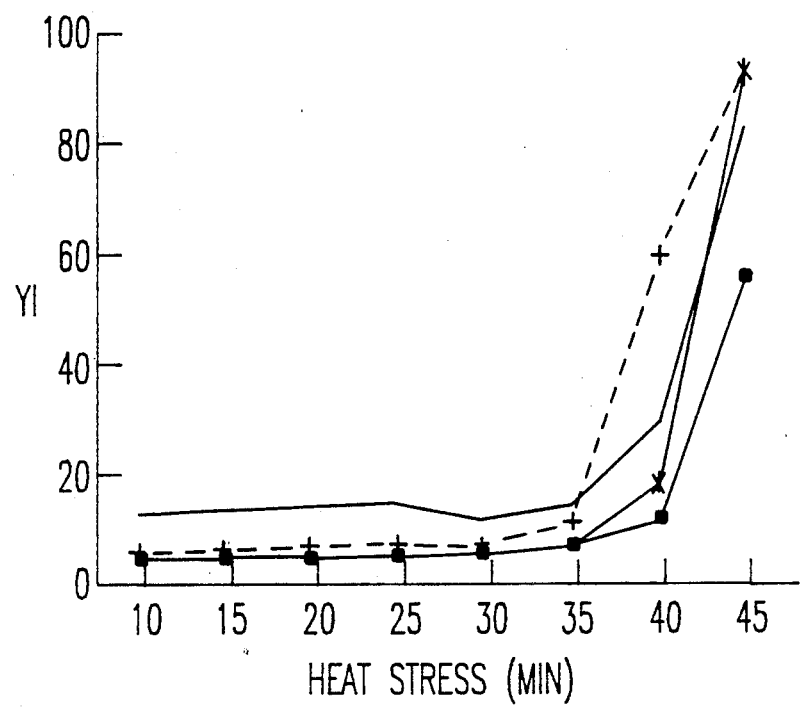

These results are presented graphically in FIG. 5.

EXAMPLE 6

Formulation 100 parts by wt. of VESTOLIT S 7054
30 parts by wt. of VESTINOL AH
0.3 parts by wt. of Montan wax

| | Heat Stress (min) | | | | | | | |
|---|---|---|---|---|---|---|---|---|
| Stabilizers | 10 | 15 | 20 | 25 | 30 | 35 | 40 | 45 |
| Zn/PC/TMP/DHP | 4 | 4 | 4 | 4 | 5 | 6 | 18 | 93 |
| Zn/PC/TMP/DHP/Py | 4 | 4 | 4 | 5 | 6 | 7 | 12 | 57 |
| Zn/PC/TMP/DHP/Cop | 4 | 4 | 4 | 5 | 7 | 23 | 95 | |
| Zn/PC/TMP/DHP/Py/Cop | 4 | 4 | 5 | 5 | 6 | 9 | 21 | |

Figure 6:
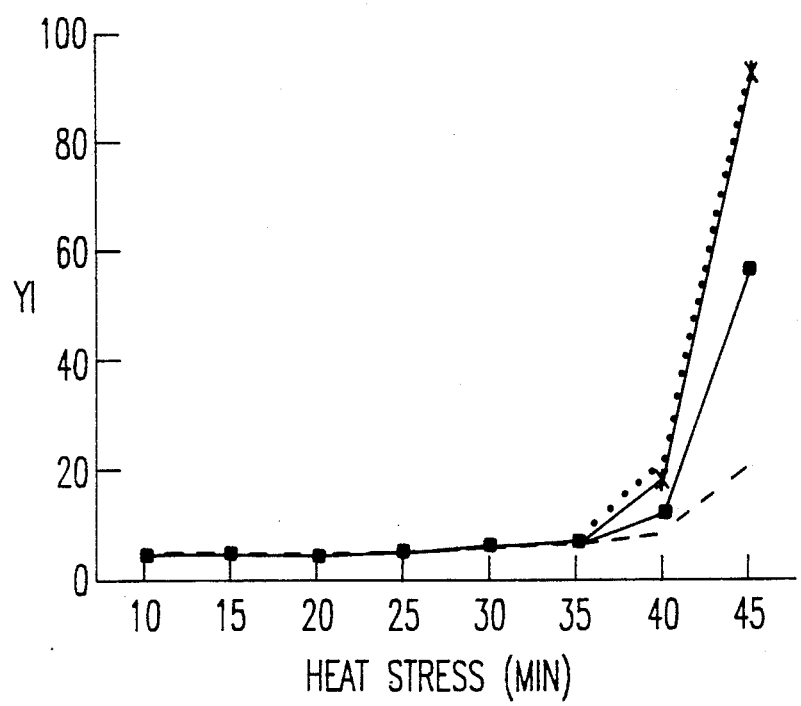

These results are presented graphically in FIG. 6.

EXAMPLES 7-16

A stabilizer mixture from Table 2 was mixed with the indicated formulation, and the results are shown in each example.

TABLE 2

| Formulations of Stabilizers (parts by weight). | | | | | | | |
|---|---|---|---|---|---|---|---|
| | Zn | Ca | PX | TMP | DHP | Py | Cop |
| Blank | 0 | | | | | | |
| Zn/Ca | 0.5 | 1 | | | | | |
| Zn/PX | 0.2 | | 0.2 | | | | |
| Zn/PX/TMP | 0.2 | | 0.2 | 0.5 | | | |
| Zn/PX/DHP | 0.2 | | 0.2 | | 0.07 | | |
| Zn/PX/TMP/DHP | 0.2 | | 0.2 | 0.5 | 0.07 | | |
| Zn/PX/TMP/DHP/Py | 0.2 | | 0.2 | 0.5 | 0.07 | 0.1 | |
| Zn/PX/TMP/DHP/Cop | 0.2 | | 0.17 | 0.5 | 0.07 | | 0.03 |
| Zn/PX/TMP/DHP/Py/Cop | 0.2 | | 0.17 | 0.5 | 0.07 | 0.1 | 0.03 |

EXAMPLE 7

Formulation 100 parts by wt. of VESTOLIT S 6058
1.0 part by wt. of stearic acid

| | Heat Stress (min) | | | | | |
|---|---|---|---|---|---|---|
| Stabilizers | 10 | 15 | 20 | 25 | 30 | 35 |
| Zn/Ca | 43 | 45 | 46 | 51 | 56 | 66 |
| Zn/PX | 23 | 25 | 29 | 32 | 38 | 65 |

-continued

| Stabilizers | Heat Stress (min) | | | | | |
|---|---|---|---|---|---|---|
| | 10 | 15 | 20 | 25 | 30 | 35 |
| Zn/PX/TMP/DHP | 7 | 9 | 10 | 12 | 15 | 68 |
| Zn/PX/TMP/DHP/Py | 9 | 10 | 11 | 14 | 20 | 69 |

Figure 7:
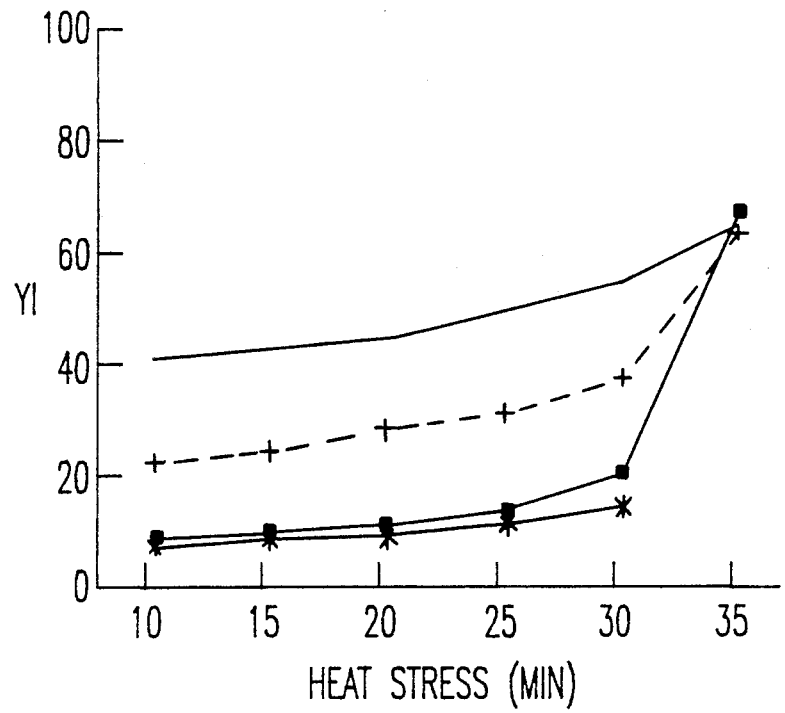
FIGS. 7, 11 and 13 graphically illustrate the heat-stabilizing effect of various stabilizers in various thermoplastic molding compositions by plotting the Yellowness Index (YI) as a function of the time of heat stress, for the stabilizers: Zn/Ca( ), Zn/PX (+), Zn/PX/TMP/DHP (*), and Zn/PX/TMP/DHP/Py (□)

These results are presented graphically in FIG. 7.

EXAMPLE 8

Formulation 100 parts by wt. of VESTOLIT S 6058
1.0 part by wt. of stearic acid

| Stabilizers | Heat Stress (min) | | | | | |
|---|---|---|---|---|---|---|
| | 10 | 15 | 20 | 25 | 30 | 35 |
| Zn/PX/TMP/DHP | 7 | 9 | 10 | 12 | 15 | 68 |
| Zn/PX/TMP/DHP/Py | 9 | 10 | 11 | 14 | 20 | 69 |
| Zn/PX/TMP/DHP/Cop | 7 | 8 | 10 | 13 | 17 | 48 |
| Zn/PX/TMP/DHP/Py/Cop | 7 | 9 | 10 | 12 | 15 | 80 |

Figure 8:
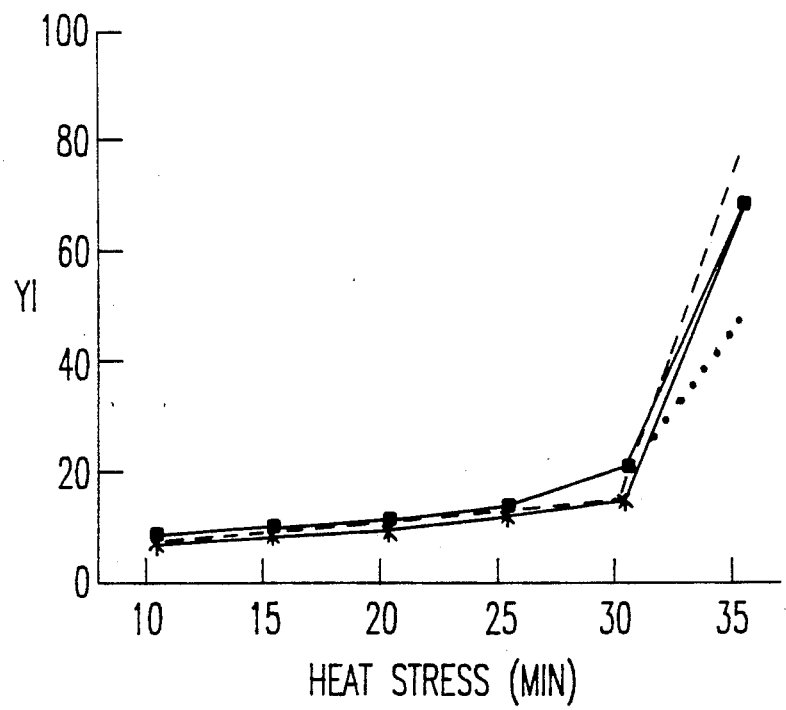
FIGS. 8, 10, 12, 14 and 16 graphically illustrate the heat-stabilizing effect of various stabilizers in various thermoplastic molding compositions by plotting the Yellowness Index (YI) as a function of the time of heat stress, for the stabilizers: Zn/PX/TMP/DHP (*), Zn/PX/TMP/DHP/Py (□), Zn/PX/TMP/DHP/Cop (·), and Zn/PX/TMP/DHP/Py/Cop (—)

These results are presented graphically in FIG. 8.

EXAMPLE 9

Formulation 100 parts by wt. of VESTOLIT S 7054
30 parts by wt. of VESTINOL AH
0.3 parts by wt. of zinc stearate
0.6 parts by weight of barium stearate

| Stabilizers | Heat Stress (min) | | | | | | | | | | | | | |
|---|---|---|---|---|---|---|---|---|---|---|---|---|---|---|
| | 10 | 15 | 20 | 25 | 30 | 35 | 40 | 45 | 50 | 55 | 60 | 65 | 70 | 75 |
| Blank | 13 | 13 | 15 | 12 | 10 | 9 | 23 | 83 | — | — | — | — | — | — |
| Zn/Px | 11 | 12 | 13 | 15 | 14 | 13 | 14 | 18 | 32 | 66 | 93 | — | — | — |
| Zn/Px/TMP/DHP | 6 | 7 | 7 | 9 | 12 | 16 | 20 | 17 | 16 | 25 | 51 | 80 | — | — |
| Zn/Px/TMP/DHP/Py | 7 | 7 | 7 | 9 | 12 | 15 | 18 | 20 | 24 | 29 | 34 | 43 | 61 | 84 |

Figure 9:
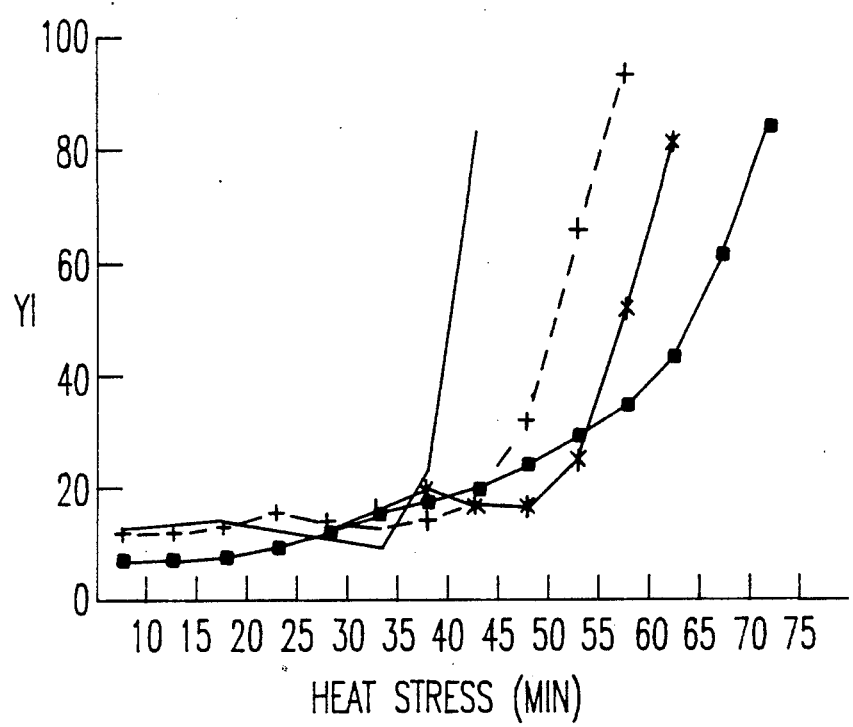
FIG. 9 graphically illustrates the heat-stabilizing effect of various stabilizers in a thermoplastic molding composition by plotting the Yellowness Index (YI) as a function of the time of heat stress, for the stabilizers: blank (·), Zn/PX (+), Zn/PX/TMP/DHP (*), and Zn/PX/TMP/DHP/Py (□)

These results are presented graphically in FIG. 9.

EXAMPLE 10

Formulation 100 parts by wt. of VESTOLIT S 7054
30 parts by wt. of VESTINOL AH
0.3 part by wt. of zinc stearate
0.6 part by weight of barium stearate

| Stabilizers | Heat Stress (min) | | | | | | | | | | | | |
|---|---|---|---|---|---|---|---|---|---|---|---|---|---|
| | 10 | 15 | 20 | 25 | 30 | 35 | 40 | 45 | 50 | 55 | 60 | 65 | 70 |
| Zn/PX/TMP/DHP | 6 | 7 | 7 | 9 | 12 | 16 | 20 | 17 | 16 | 25 | 51 | 80 | — |
| Zn/Px/TMP/DHP/Py | 7 | 7 | 7 | 9 | 12 | 15 | 18 | 20 | 24 | 29 | 34 | 43 | 61 |
| Zn/PX/TMP/DHP/Cop | 7 | 7 | 8 | 10 | 13 | 17 | 19 | 16 | 18 | 29 | 60 | 89 | — |
| Zn/PX/TMP/DHP/Py/Cop | 6 | 6 | 7 | 9 | 12 | 15 | 18 | 20 | 25 | 30 | 38 | 46 | 73 |

Figure 10:
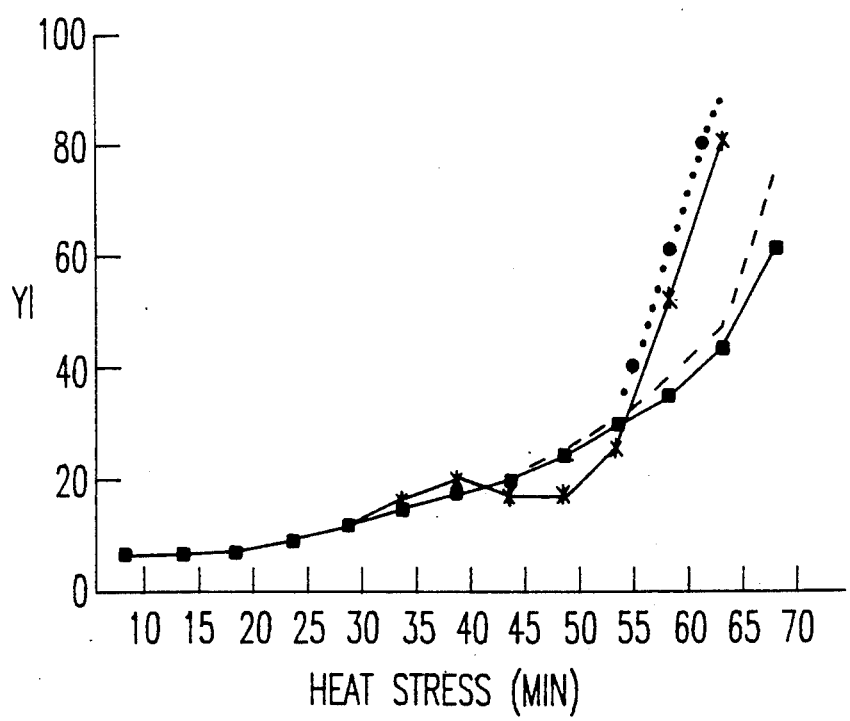

These results are presented graphically in FIG. 10.

EXAMPLE 11

Formulation 100 parts by wt. of VESTOLIT S 7054
1.0 part by wt. of stearic acid

| Stabilizers | Heat Stress (min) | | | | | | | |
|---|---|---|---|---|---|---|---|---|
| | 10 | 15 | 20 | 25 | 30 | 35 | 40 | 45 |
| Zn/Ca | 40 | 42 | 45 | 49 | 55 | 61 | 61 | — |
| Zn/PX | 22 | 25 | 29 | 34 | 37 | 61 | — | — |
| Zn/PX/TMP/DHP | 7 | 9 | 10 | 14 | 21 | 41 | — | — |
| Zn/PX/TMP/DHP/Py | 7 | 7 | 9 | 12 | 16 | 21 | 27 | 49 |

Figure 11:
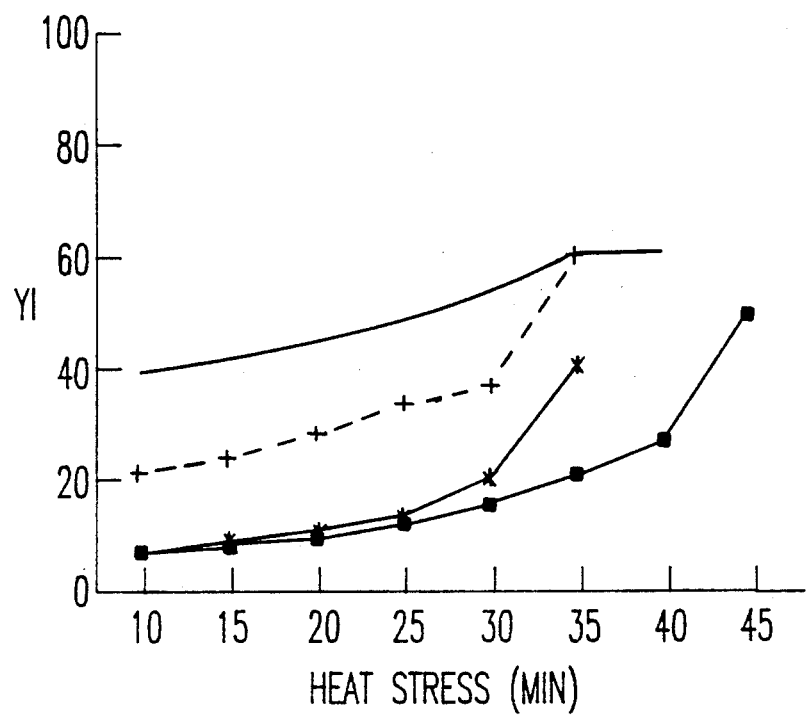

These results are presented graphically in FIG. 11.

EXAMPLE 12

Formulation 100 parts by wt. of VESTOLIT S 7054
1.0 part by wt. of stearic acid

| Stabilizers | Heat Stress (min) | | | | | | | |
|---|---|---|---|---|---|---|---|---|
| | 10 | 15 | 20 | 25 | 30 | 35 | 40 | 45 |
| Zn/PX/TMP/DHP | 7 | 9 | 10 | 14 | 21 | 41 | — | — |
| Zn/PX/TMP/DHP/Py | 7 | 7 | 9 | 12 | 16 | 21 | 27 | 49 |
| Zn/PX/TMP/DHP/Cop | 6 | 7 | 8 | 11 | 15 | 21 | 42 | — |
| Zn/PX/TMP/DHP/Py/Cop | 8 | 9 | 11 | 14 | 20 | 28 | 73 | — |

Figure 12:
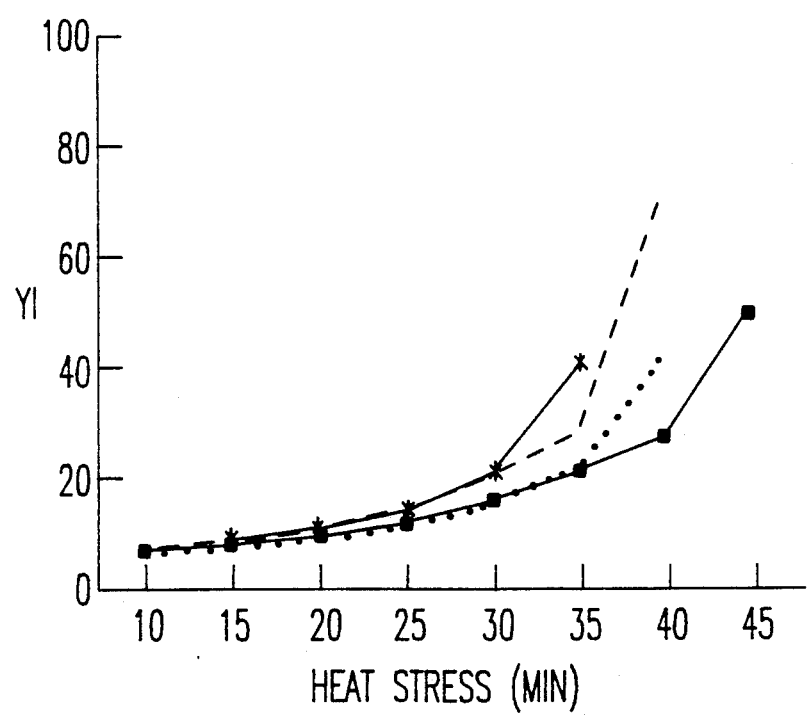

These results are presented graphically in FIG. 12.

EXAMPLE 13

Formulation 100 parts by wt. of VESTOLIT S 7054
30 parts by wt. of VESTINOL AH
0.3 parts by wt. of Montan wax

| Stabilizers | Heat Stress (min) | | | | | | | | |
|---|---|---|---|---|---|---|---|---|---|
| | 10 | 15 | 20 | 25 | 30 | 35 | 40 | 45 | 50 |
| Zn/Ca | 12 | 12 | 13 | 15 | 12 | 12 | 20 | 61 | 90 |
| Zn/PX | 6 | 6 | 7 | 8 | 9 | 9 | 40 | 91 | 95 |
| Zn/PX/TMP/DHP | 4 | 4 | 4 | 5 | 5 | 7 | 24 | 93 | 95 |
| Zn/PX/TMP/DHP/Py | 4 | 4 | 5 | 5 | 7 | 7 | 8 | 19 | 81 |

Figure 13:
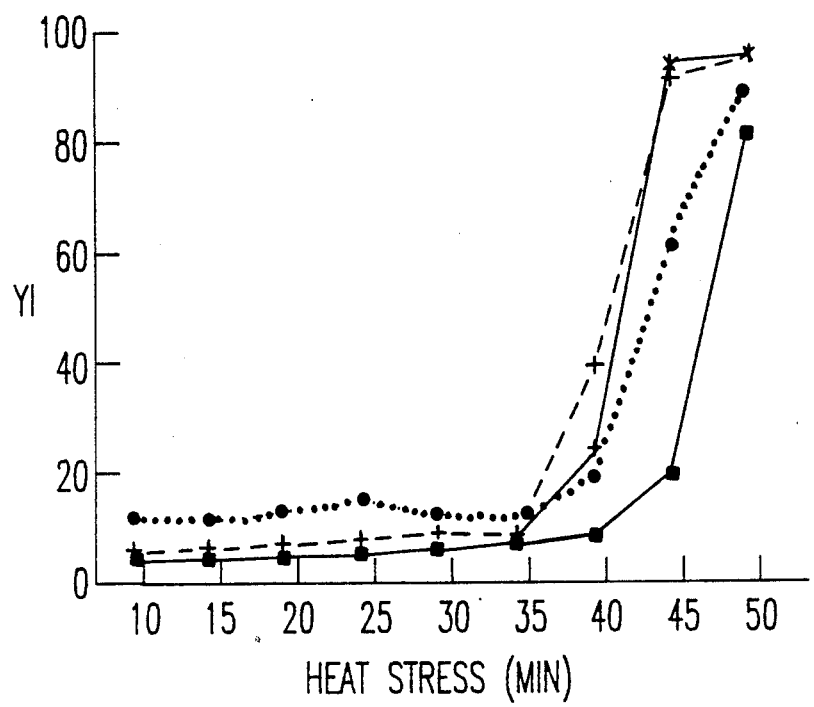

These results are presented graphically in FIG. 13.

EXAMPLE 14

Formulation 100 parts by wt. of VESTOLIT S 7054
30 parts by wt. of VESTINOL AH
0.3 part by wt. of Montan wax

| Stabilizers | Heat Stress (min) | | | | | | | | |
|---|---|---|---|---|---|---|---|---|---|
| | 10 | 15 | 20 | 25 | 30 | 35 | 40 | 45 | 50 |
| Zn/PX/TMP/DHP | 4 | 4 | 4 | 5 | 5 | 7 | 24 | 93 | 95 |
| Zn/PX/TMP/DHP/Py | 4 | 4 | 5 | 5 | 7 | 7 | 8 | 19 | 81 |

-continued

| Stabilizers | Heat Stress (min) | | | | | | | | |
|---|---|---|---|---|---|---|---|---|---|
| | 10 | 15 | 20 | 25 | 30 | 35 | 40 | 45 | 50 |
| Zn/PX/TMP/DHP/Cop | 4 | 4 | 4 | 4 | 5 | 5 | 11 | 82 | 89 |
| Zn/PX/TMP/DHP/Py/Cop | 4 | 4 | 4 | 4 | 5 | 5 | 6 | 10 | 61 |

Figure 14:
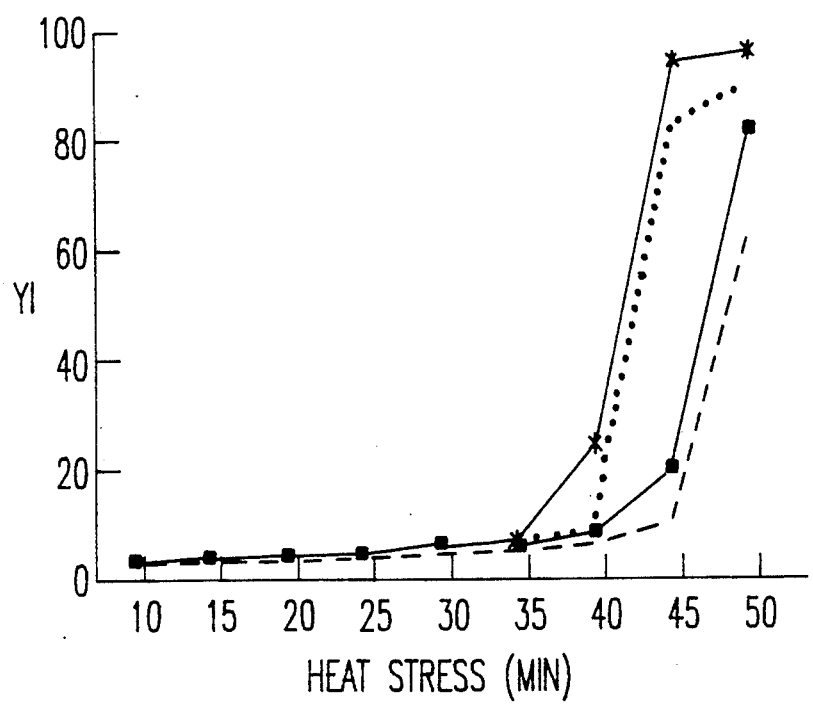
Figure 15:
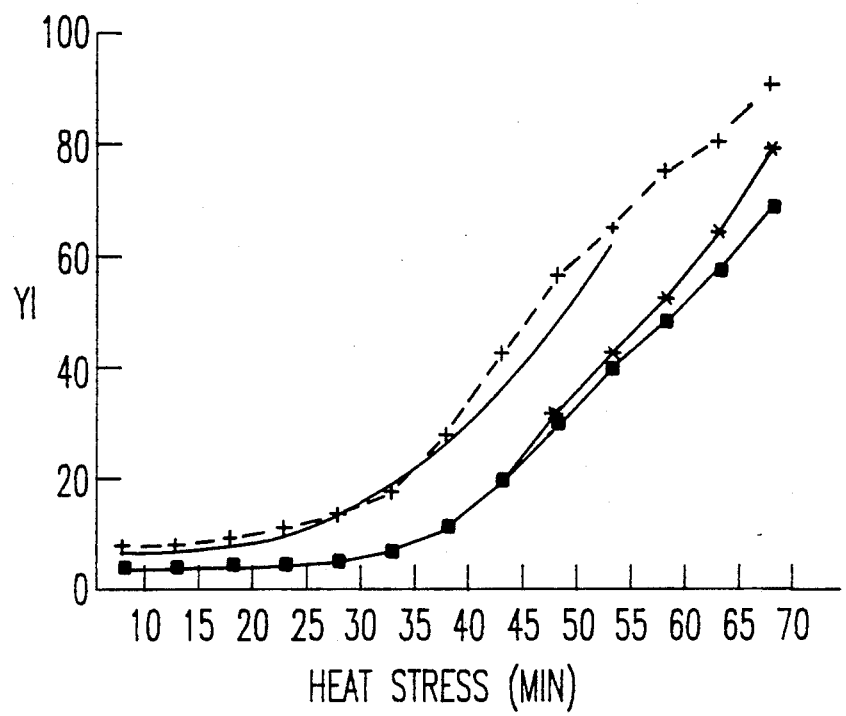
FIG. 15 graphically illustrates the heat-stabilizing effect of various stabilizers in a thermoplastic molding composition by plotting the Yellowness Index (YI) as a function of the time of heat stress, for the stabilizers: ZnOct/CaBeh/Rhod (·), Zn/PX (+), Zn/PX/TMP/DHP (*), and Zn/PX/TMP/DHP/Py (□).

These results are presented graphically in FIG. 14.

EXAMPLE 15

Formulation 100 parts by wt. of VESTOLIT M 5867
5.0 parts by wt. of Reoplast 39

| Stabilizers | Heat Stress (min) | | | | | | | | | | | | |
|---|---|---|---|---|---|---|---|---|---|---|---|---|
| | 10 | 15 | 20 | 25 | 30 | 35 | 40 | 45 | 50 | 55 | 60 | 65 | 70 |
| ZnOct/CaBeh/Rhod* | 7 | 7 | 8 | 9 | 12 | 18 | 26 | 35 | 47 | 62 | — | — | — |
| Zn/PX | 8 | 8 | 9 | 11 | 14 | 18 | 28 | 43 | 57 | 65 | 76 | 81 | 91 |
| Zn/Px/TMP/DHP | 3 | 3 | 3 | 4 | 4 | 6 | 11 | 20 | 32 | 43 | 52 | 65 | 79 |
| Zn/Px/TMP/DHP/Py | 4 | 4 | 4 | 5 | 5 | 7 | 12 | 19 | 29 | 40 | 48 | 58 | 69 |

*Comparative sample: 0.075 parts of ZnOct/0.35 parts of CaBeh/0.3 parts of Rhod.
These results are presented graphically in FIG. 15.

EXAMPLE 16

Formulation 100 parts by wt. of VESTOLIT M 5867
5.0 parts by wt. of Reoplast 39

| Stabilizers | Heat Stress (min) | | | | | | | | | | | | | | |
|---|---|---|---|---|---|---|---|---|---|---|---|---|---|---|---|
| | 10 | 15 | 20 | 25 | 30 | 35 | 40 | 45 | 50 | 55 | 60 | 65 | 70 | 75 | 80 |
| Zn/PX/TMP/DHP | 3 | 3 | 3 | 4 | 4 | 6 | 11 | 20 | 32 | 43 | 52 | 65 | 79 | 82 | — |
| Zn/Px/TMP/DHP/Py | 4 | 4 | 4 | 5 | 5 | 7 | 12 | 19 | 29 | 40 | 48 | 58 | 69 | 83 | — |
| Zn/PX/TMP/DHP/Cop | 3 | 3 | 3 | 4 | 4 | 7 | 13 | 23 | 34 | 43 | 52 | 63 | 76 | — | — |
| Zn/PX/TMP/DHP/Py/Cop | 4 | 4 | 4 | 4 | 6 | 7 | 11 | 19 | 29 | 38 | 48 | 57 | 65 | 74 | 86 |

Figure 16:
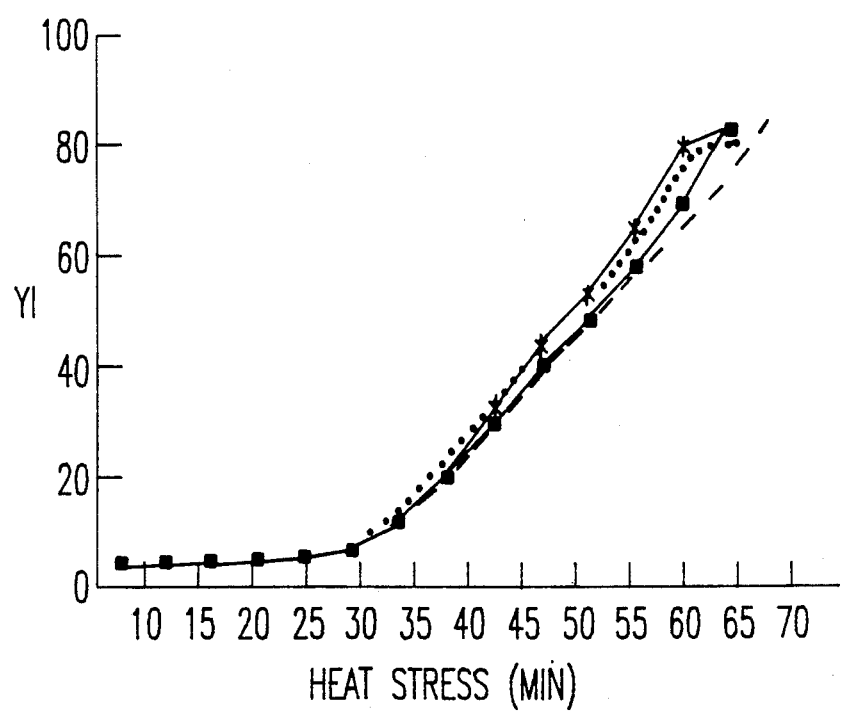

These results are presented graphically in FIG. 16.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A stabilized thermoplastic molding composition comprising,
   (a) a halogen-containing polymer;
   (b) one or more compounds of zinc of formula (I)

$$R^1O-Zn-OR^2 \qquad (I)$$

wherein $R^1$ and $R^2$ are identical or different and represent a straight-chain or branched, hydroxyl-substituted or unsubstituted aliphatic acyl group having from 8 to 21 carbon atoms or an aryl group which is optionally substituted with alkyl groups having 1 to 22 carbon atoms;
   (c) at least one polymeric primary stabilizer selected from the group of polyoxazolines of formula (II)

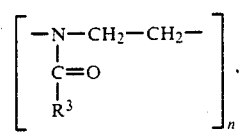
   (II)

wherein each occurrence of $R^3$ can be different and is, independently, a straight-chain or branched alkyl group having 1 to 22 carbon atoms or substituted or unsubstituted cycloalkyl or aryl group, and n represents an integer of from 10 to 10,000; and (d) at least two primary-stabilizer-supporting compounds of the formulae (III), (V) or (VI):

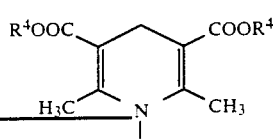
   (III)

wherein (V) is a copolymer of

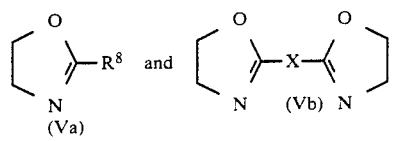

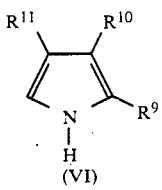
   (VI)

wherein
in formula (III), $R^4$ is $C_9$–$C_{22}$-alkyl or $C_9$–$C_{22}$-alkenyl, cyclohexyl, phenyl or substituted phenyl;
in formulae (Va) or (Vb), $R^8$ is a straight-chain or branched alkyl group having from 1 to 20 carbon atoms, a cyclic and/or alkyl-substituted cyclic alkyl group having from 5 to 10 carbon atoms, a straight-chain or branched alkenyl group having from 3 to 18 carbon atoms, an alkyl-, halogeno- or hydroxyl-substituted aryl group, a straight-chain or branched alkoxy group having from 1 to 20 carbon atoms, a straight-chain or branched alkylcarbonyl group having from 1 to 20 carbon atoms or a cyano group;

X is a straight-chain or branched alkylene group having from 1 to 20 carbon atoms, a cyclic and/or alkyl-substituted cyclic alkylene group having from 5 to 10 carbon atoms, a straight-chain or branched alkenylene group having from 3 to 18 carbon atoms, an alkyl-, halogeno-, cyano- or hydroxyl-substituted arylene group, a straight-chain or branched alkyleneoxy group having from 1 to 20 carbon atoms, a straight-chain or branched alkylenecarbonyl group having from 1 to 20 carbon atoms; and in formula (VI), $R^9$ is methyl or phenyl, $R^{10}$ is hydrogen, cyano, $C_2$-$C_{10}$-alkylcarbonyl, $C_7$-$C_{10}$-arylcarbonyl, phenylaminocarbonyl, m-hydroxyphenylaminocarbonyl, α-hydroxyethyl, or carboxyl which has been esterified with a $C_1$-$C_{18}$-alcohol, $C_6$-$C_8$-cycloalkanol, $C_5$-$C_{19}$-aralkanol, $C_2$-$C_{20}$-alkanediol, $C_4$-$C_{20}$-thioalkanediol or pentaerythritol, and $R^{11}$ is methyl, phenyl or ($C_1$-$C_{19}$-alkoxy)methyl.

2. The stabilized molding composition of claim 1, wherein said compounds of formulae (I) and (II) are each present in amounts of 0.02 to 2.0 percent by weight and the compounds of the formulae (III), (V), and (VI) are present in amounts of 0 to 2.0 percent by weight, based on the weight of the chlorine-containing polymer.

3. The stabilized molding composition of claim 1, further comprising a primary stabilizer in the form of a compound of zinc, lead or antimony or a combination of compounds of cadmium, barium, calcium and zinc and an additional costabilizer selected from the group consisting of phosphites, 1,3-diketones, polyols, alkylated phenols, cyanamides, dicyandiamides, guanamines, indoles, pyrazoles, ureas, thioureas, monophenylureas, diphenylthiourea and aminocrotonic esters.

4. The stabilized molding composition of claim 1, further comprising a compound of formula (IV)

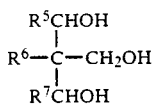
(IV)

wherein $R^5$ and $R^7$ are hydrogen and $R^6$ is hydrogen, methyl, ethyl, or propyl.

5. The stabilized molding composition of claim 1, wherein said compound of formula IV is present in an amount of up to 2.0 percent by weight based on the weight of the halogen-containing polymer.

6. The stabilized molding composition of claim 1, wherein $R^3$ is an alkyl group having 1 to 12 carbon atoms.

7. The stabilized molding composition of claim 1, wherein said halogen-containing polymer is polyvinyl chloride.

8. A stabilizer mixture, comprising:
(a) one or more compounds of zinc of formula (I)

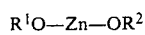 (I)

wherein $R^1$ and $R^2$ are identical or different and represent a straight-chain or branched, hydroxyl-substituted or unsubstituted aliphatic acyl group having from 8 to 21 carbon atoms or an aryl group which is optionally substituted with alkyl groups having 1 to 22 carbon atoms;

(b) at least one polymeric primary stabilizer selected from the group of polyoxazolines of formula (II)

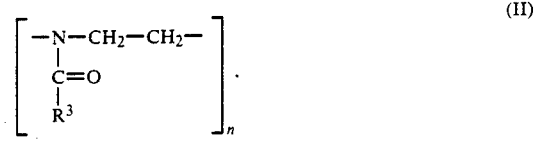

wherein each occurrence of $R^3$ can be different and is, independently, a straight-chain or branched alkyl group having 1 to 22 carbon atoms or substituted or unsubstituted cycloalkyl or aryl group, and n represents an integer of from to 10,000; and (c) at least two primary-stabilizer-supporting compounds of the formulae (III), (V) or (VI):

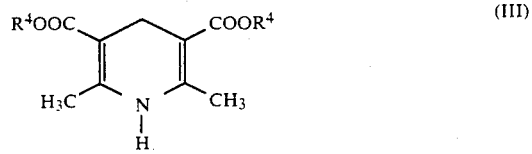

wherein (V) is a copolymer of

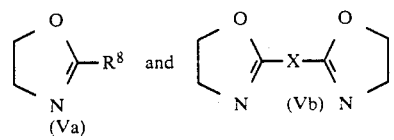

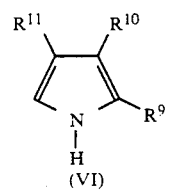

wherein
in formula (III), $R^4$ is $C_9$-$C_{22}$-alkyl or $C_9$-$C_{22}$-alkenyl, cyclohexyl, phenyl or substituted phenyl;
in formulae (Va) and (Vb), $R^8$ is a straight-chain or branched alkyl group having from 1 to 20 carbon atoms, a cyclic and/or alkyl-substituted cyclic alkyl group having from 5 to 10 carbon atoms, a straight-chain or branched alkenyl group having from 3 to 18 carbon atoms, an alkyl-, halogen- or hydroxyl-substituted aryl group, a straight-chain or branched alkoxy group having from 1 to 20 carbon atoms, a straight-chain or branched alkylcarbonyl group having from 1 to 20 carbon atoms or a cyano group;

X is a straight-chain or branched alkylene group having from 1 to 20 carbon atoms, a cyclic and/or alkyl-substituted cyclic alkylene group having from 5 to 10 carbon atoms, a straight-chain or branched alkenylene group having from 3 to 18 carbon atoms, an alkyl-, halogeno-, cyano- or hydroxyl-substituted arylene group, a straight-chain or branched alkyleneoxy group having from 1 to 20 carbon atoms, a straight-chain or branched alkylenecarbonyl group having from 1 to 20 carbon atoms; and in formula (VI), $R^9$ is methyl or phenyl, $R^{10}$ is hydrogen, cyano, $C_2$–$C_{10}$-alkylcarbonyl, $C_7$–$C_{10}$-arylcarbonyl, phenylaminocarbonyl, m-hydroxyphenylaminocarbonyl, α-hydroxyethyl, or carboxyl which has been esterified with a $C_1$–$C_{18}$-alcohol, $C_6$–$C_8$-cycloalkanol, $C_5$–$C_{19}$-aralkanol, $C_2$–$C_{20}$-alkanediol, $C_4$–$C_{20}$-thioalkanediol or pentaerythritol, and $R^{11}$ is methyl, phenyl or ($C_1$–$C_{19}$-alkoxy)methyl.

9. The stabilizer mixture of claim 8, further comprising a compound of formula (IV)

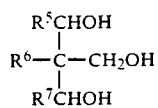

(IV)

wherein $R^5$ and $R^7$ are hydrogen and $R^6$ is hydrogen, methyl, ethyl, or propyl.

10. The stabilizer mixture of claim 8, wherein $R^3$ is an alkyl group having 1 to 12 carbon atoms.

* * * * *